Patented May 30, 1950

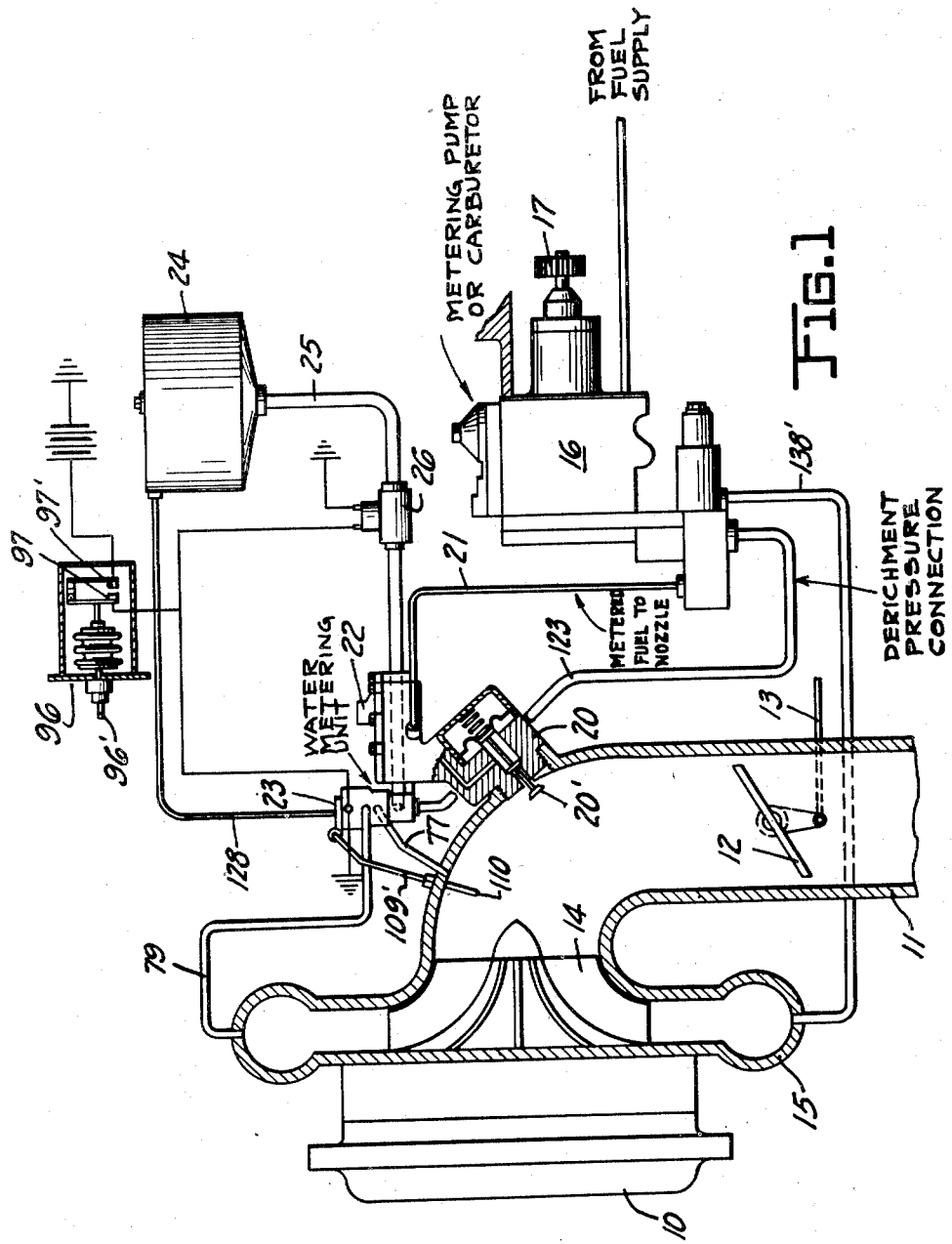

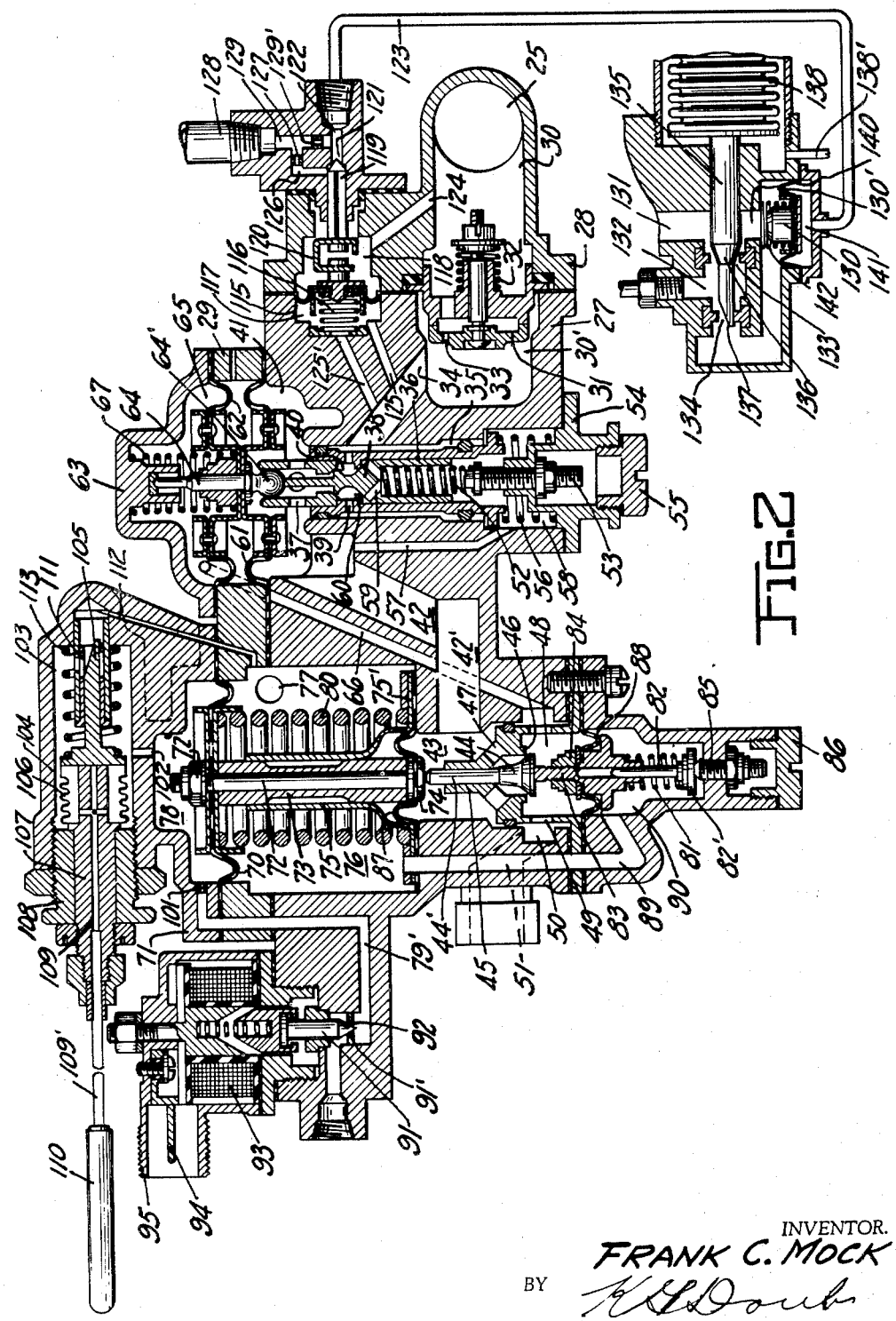

2,509,648

UNITED STATES PATENT OFFICE 2,509,648

AUXILIARY CHARGE REGULATING DEVICE

Frank C. Mock, South Bend, Ind., assignor to Bendix Aviation Corporation, South Bend, Ind., a corporation of Delaware Application April 12, 1945, Serial No. 588,023

10 Claims. (Cl. 261—18)

This invention relates to an auxiliary charging system for internal-combustion engines and other power units to which it may be adapted, and is particularly concerned with improvements in the so-called "water injection systems" by means of which an auxiliary charging component or medium (which may be water, alcohol, water-alcohol mixtures, liquid-saturated hydrocarbons and other solutions or substances or a mixture thereof) is incorporated in the normal fuel/air mixture during the charging operation to modify the action of the charge, as by functioning as a coolant or anti-detonating means, anti-toxic agent or otherwise.

When such systems function as an anti-detonating means for aircraft power units, they usually are active only when the engine is operating in a relatively high power range which varies with the operating characteristics of different engines. For supercharger aircraft engines this range may be, for example, from 65 to 90 inches absolute manifold pressure. These high pressures are produced by one or more stages of supercharging, and the rise across the final stage or engine-driven supercharger, or across the entire system or some predetermined part thereof, may be taken as a fairly accurate index of manifold or charging pressure. However, pressure alone does not necessarily determine the quantity of water or other auxiliary medium injected relative to the fuel charge, since detonation is influenced also by temperature, and the water in the charge functions primarily as a coolant in preventing detonation. Therefore, assuming a safe upper temperature limit for the engine cylinders, the quantity of water injected should vary as the external air temperature and as the temperature rise from external atmosphere or the scoop inlet to the intake manifold, with suitable allowance for air cooling as by coolers and intercoolers where such devices are used. Proceeding on this theory, accurate metering of the auxiliary charge should be had by a unit which meters as a function of manifold pressure and temperature. From a practical standpoint, however, the problem is not so simple. When the engine accelerates and the supercharger or superchargers immediately respond, there is a rapid rise in pressure and temperature in the intake manifold, and it is difficult to obtain a response accurately and without lag with known types of auxiliary charge metering devices.

The present invention provides a metering unit which responds quickly and accurately to the pressure rise across the supercharger or superchargers, and it is also capable of operating as a function of charge temperature. For the latter, advantage is taken of the fact that the temperature rise is closely proportional to the pressure rise, and hence if a unit could be constructed which would meter as a function of external air temperature and the pressure rise across the supercharging system, it would meter in relation to both pressure and temperature of the air in the intake manifold. This would permit the temperature bulb or other sensitive element to be located at a point where it is not subject to the rapid and extreme changes encountered in the intake manifold, since it could perform its allotted function by sensing changes in the temperature of intake or atmospheric air prior to compression.

An object of the present invention, therefore, is to provide an auxiliary charge metering system which in conjunction with a primary metering system will meter an auxiliary charge medium, such as water, in relation to charge pressure and temperature in a manner such as to produce a "best power mixture" throughout the high power range.

Another object is to provide an improved auxiliary charge injection device of the type adapted to meter an auxiliary charge medium in relation to charging pressure as indicated by the pressure rise across the supercharger or supercharging system.

Another object is to provide a device of the type specified which will meter an auxiliary charge component in response to changes in charging pressure only or in response to changes in both charging pressure and temperature.

A further object is to provide a unit for metering an auxiliary charge component which may be readily adapted for use with different types of fuel-feeding systems.

A still further object is to generally improve and render more safe and dependable auxiliary charge injection systems.

The foregoing and other objects and advantages will become apparent in view of the following description taken in conjunction with the drawings, wherein:

Figure 1 is a diagrammatic representation of an aircraft engine or power plant provided with an auxiliary charging system in accordance with the invention; and Figure 2 is a diagrammatic sectional view of the auxiliary charge metering unit and coacting derichment system as applied to a speed-density metering pump.

Referring to the drawings and first to Figure 1, an engine 10 has an air induction conduit or scoop 11 provided with a throttle 12, which may be controlled either manually or automatically through linkage 13 leading to a pilot's control lever, not shown. A supercharger 14 delivers air under pressure to the engine through a supercharger ring or manifold 15 which may be connected to the respective engine cylinders in any suitable manner not shown. While only one stage of supercharging is shown, it will be apparent that the present system will function with either one or more stages; in the drawings, it is arranged to meter in relation to the rise across the primary or engine-driven supercharger.

Fuel may be supplied to the engine by any suitable fuel-feeding device. In the present instance the improved auxiliary charge metering system is shown coordinated with a metering device such as that illustrated in my copending application Serial No. 586,223, filed April 2, 1945, and indicated at 16 in Figure 1 of the drawings. Since the particular construction of this device outside of the parts which directly coact with the derichment system is unnecessary to an understanding of the present invention, the details thereof are not shown. Briefly, it includes a pressure feed pump which is driven in synchronism with the engine by means of suitable drive connections including drive gear 17, the pump driving a centrifugal governor and supplying fuel under pressure to a chamber in which the governor is mounted. The governor is operatively connected to a poppet valve disposed in the fuel conduit upstream of a metering orifice and controlling flow of fuel to said orifice, said valve also having connected thereto a metering head diaphragm which opposes the opening force exerted on the valve by the governor; the arrangement being such that the poppet valve regulates the metering head to be proportional to engine speed squared, and hence the flow through the metering orfice will be proportional to engine speed for a given area of said orifice. The area of the metering orifice is variable however by means of a needle controlled by a capsule which responds to manifold pressure modified by a predetermined increment of exhaust back pressure. By this means fuel is not only metered in relation to engine speed but also in relation to mass air consumption.

Metered fuel from the metering pump flows to the pressure chamber of a spray nozzle assembly 20 by way of conduit 21 and accelerator pump 22 which is shown connected to or forming part of the water-metering unit generally indicated at 23 and constituting the subject-matter of the present invention. The accelerator pump provides a convenient mixing chamber for fuel and water or other supplemental fluid being used, although the water or other fluid could obviously be injected into the metered fuel at any other suitable point. When the fuel pressure attains a predetermined value, it opens a spring-pressed fuel nozzle 20' and fuel is sprayed into the conduit 11 posterior to the throttle 12. For convenience and compactness in installation, the accelerator pump, spray nozzle and water metering unit constitute a complete assembly, but it will be apparent that these parts could be separated and located in any convenient manner to meet the space requirements of different installations.

A water or other auxiliary fluid supply tank 24 of suitable capacity is provided and has a conduit 25 leading therefrom to the water metering unit 23, said conduit having mounted therein a pump 26 which may be of conventional construction having an inbuilt by-pass rendered operative when a predetermined delivery pressure is encountered. This pump may be electrically driven and operatively connected to a power control unit as illustrated and described in the copending application of Stanley B. Smith and Frank C. Mock, Serial No. 533,296, filed April 29, 1944, and which application also embodies certain features in common with those of the present invention.

Referring now to Figure 2, the metering unit or assembly 23 comprises a main casting or housing 27, end member 28 and spacer member 29 which are suitably secured to one another and provided with a series of valve chambers and interconnecting passages arranged in a manner and for a purpose to be described. A primary intake chamber is indicated at 30 and a secondary intake chamber at 30', water being delivered to the chamber 30 by conduit 25. Between the chambers 30 and 30' is a valve 31 which opens against the resistance of an adjustable spring 32 and is provided with a small orifice or jet 33. This valve may be aptly termed a "derichment timing valve."

From chamber 30' the incoming water flows through passage 34 to a chamber 35 having therein a valve cage or guide 36 provided with upper and lower gaskets sealing off the chamber 35. A guide member 37 fits into the upper end of the cage 36 and provides a seat for poppet valve 38. When valve 38 unseats, water may flow by way of ports 39, chamber 40 and openings in guide 37 to a diaphragm chamber 41, and thence by way of passage 42, 42' to metering head chamber 43 having therein a metering valve 44 provided with a stem 44' slidable in guide cage 45 defining a valve seat 46 and provided with ports 47 through which water flows when the valve is opened to metered water chamber 48 and thence through openings 49, chamber 50 and passage 51 to the metered fuel flowing to the engine to be intermingled therewith and discharged through nozzle 20', Figure 1, which as heretofore explained is set to open at a predetermined pressure.

The poppet valve 38 determines the pressure of the water in chamber 41 and hence in chamber 43 and it also controls the pressure drop across the metering valve 44; it is urged toward seated position by a spring 52 mounted in the lower hollow skirt portion of the valve and adjustable by means of a screw 53 threaded through a fitting 54 secured in sealed relation to the housing 27 and provided with a sealed closure and drain plug 55. Another spring 56 disposed between the fitting 54 and valve cage 36 maintains the latter in position. The valve 38 is balanced by means of a channel 57 which communicates chamber 58 on the lower side of the valve with chamber 41 on the opposite side thereof. When the valve opens, communication is had with chamber 58 through ports 59 formed in the valve below a seat 60.

A pair of diaphragms 61 and 62 have their peripheral edge portions clamped between spacer 29 and housing 27 and between cap 63 and said spacer. Reversely contoured thin metal supporting and reinforcing plates are clamped on opposite sides of the central portions of these diaphragms and have connected thereto a guide rod 64 terminating at its lower end in a ball head 64' in contact with the stem of the valve 38. A plurality of diaphragms are preferably used to promote better control and also to prevent reversal of the diaphragm folds due to oppositely acting pressures, but it will be obvious that one diaphragm if properly constructed could serve equally well.

Between the diaphragm 62 and cap 63 is a chamber 65 which is vented to, or in communication with chamber 50 by means of a channel 66; and since the pressure in chamber 50 is equal to discharge nozzle pressure, or that which exists at the nozzle 20' when the engine is in operation, like pressures will be maintained in chamber 65, and thus the pressure at which the valve 38 opens and hence the pressure in chamber 41 may always be maintained at a predetermined constant value above discharge-nozzle pressure by a spring 67 seated at its one end in a seat provided by one of the diaphragm plates and at its opposite end in the cap 63. Also, since the pressure in chamber 41 and hence in 43 is always maintained at a constant value above discharge nozzle pressure and the pressure in chamber 48 is maintained at discharge nozzle pressure, a constant pressure drop will be maintained across metering valve 44.

Means is provided whereby the metering valve 44 is caused to travel in relation to the pressure rise across the supercharger, such means in the unit illustrated in the drawings comprising a diaphragm 70 having its peripheral edge portion clamped between the spacer 29 and a cap 71 and its central portion clamped between thin metal reinforcing plates to which the upper end of a rod or bolt 72 is connected as by nut 72' and spacer and guide bushing 73, the opposite or lower headed end 74 of the rod or bolt 72 contacting the stem 44' of the valve 44. A guide 75 surrounds the bushing 73 and terminates at its lower end in a flange 75' which is seated on an annular ledge resulting from the formation of chamber 76 in the housing or casting 27 and to which chamber supercharger inlet pressure is communicated by means of conduit 77 (note also Figure 1); and on the side of diaphragm 70 opposite chamber 76 is another chamber 78 to which manifold or supercharger outlet pressure is communicated by means of conduit 79 and channel or duct 79', the latter being controlled in a manner to be described. A spring 80 normally urges the rod 72 in a valve-seating direction and permits the valve 44 to seat until the supercharger pressure differential attains a predetermined value.

The metering valve 44 is maintained seated against the higher pressure which exists in chamber 43 relative to that in chamber 48 by a spring 81 seated on the headed end 82' of a guide rod 82 and normally urging an adjustable contact 83 mounted in a bushing 84 into abutting engagement with a boss projecting from the body portion of the valve 44. A screw 85, accessible upon removal of sealing nut 86, provides ready adjustment of spring 81.

Diaphragms 87 and 88 are sealing diaphragms; they are of equal effective area in order that they may tend to balance out their effect on the valve 44. A channel or duct 89 communicates at one end with chamber 90 and at its opposite end with the chamber 76, to equalize the pressures on the outer sides of these diaphragms.

The duct or passage 79' which communicates manifold or supercharger outlet pressure to the chamber 78 is controlled by a valve 91 adapted to seat at 91' and close port 92. The valve 91 is preferably electrically operated and is therefore shown as of the solenoid type provided with a coil 93 to which current may be conducted by means of terminal 94 located in a socket 95.

The solenoid valve 91 may be operated either manually or automatically and in timed relation with an engine condition. Figure 1 shows the valve adapted for operation from a control switch 96 provided with a plunger 96' adapted to close contacts 97, 97' and simultaneously complete a circuit to the electrically driven pump 26 and the solenoid coil 93. The plunger 96' may be located for operation by a power control lever when the latter is moved to the emergency power range; by a device responsive to manifold pressure or other emergency power conditions; by a manual control, or in any other suitable manner.

A self-contained temperature compensating unit is built into the cover 71 which forms the top wall of chamber 78. The cover carries a restriction 101 located in the duct or passage 79', and the top of the cover is provided with a port or passage 102 leading to a chamber 103 defined by an integral casing or housing 104 mounting a valve assembly including a needle 105 which is connected to the movable end of a bellows 106, the opposite end of the bellows being anchored to a core 107 threaded in a bushing 108, the core being formed with a bore 109 to which a conduit 109' is connected and leads to a temperature bulb 110 disposed in the air induction conduit of the engine, note also Figure 1. The needle 105 is provided with a tapered end adapted to variably control the area of an orifice 111 and thus regulate communication between the chamber 103 and a passage 112 leading to the chamber 76. A spring 113 opposes the expansion action of the temperature bellows 106. The bulb 110, tube or conduit 109', bore 109 and bellows 106 may be loaded with a suitable fluid, responsive to changes in temperature.

It will be seen that when the temperature of the air in the air induction conduit rises, bellows 106 will expand, causing the needle to move outwardly into the orifice 111 and restrict the latter, the reverse action taking place upon a drop in temperature. As the needle gradually restricts orifice 111, the pressure on the upper side of diaphragm 70 for a given pressure rise across the supercharger is proportionally greater, and the differential across the diaphragm increases, so that as the temperature of the air increases, the metering valve 44 will proportionally enlarge the metering orifice controlled thereby.

In Figure 1 it will be noted that the temperature bulb 110 is located in the induction conduit 11 at the entrance to the supercharger 14. At this point, it is subject to the temperature of the air prior to compression. From this point on, the temperature varies in proportion to compression, or substantially so, and the rise across the supercharger is an index of both pressure and temperature. If this is modified by the temperature of the atmospheric or intake air, and the resultant differential applied across the diaphragm 70, the travel of the metering valve will be in direct proportion to charging pressure and temperature, while at the same time the temperature bulb is not subject to such rapid and extreme changes or fluctuations as would be the case were it located at the discharge side of the supercharger or in the intake manifold. This avoids lag due to the inability of a temperature unit to function properly under such rapid changes. Where multi-stage supercharging systems are used, it is preferred to locate the temperature bulb anterior to the supercharging system. However, there may be instances where the temperature rise between stages is such as would render location of the bulb 110 intermediate the respective stages entirely feasible, particularly where the temperature of the air may be modified by heat-exchangers or coolers.

It is important that the fuel/air ratio be properly proportioned for emergency power with water at the time water or other fuel additive is injected into the stream of fuel flowing into the discharge nozzle. Therefore, a derichment system is provided which functions to reduce the quantity of fuel flowing to the engine when water injection starts.

The fuel derichment system in the present instance comprises a diaphragm 115 having its peripheral edge portion clamped between contiguous flanges formed on the housings or castings 27 and 28 and sealing off registering cavities therein into two chambers 117 and 118. A spring 116 urges the diaphragm toward valve-seating position. A valve 119 is connected to the diaphragm 115 by means of clevis-shaped member 120, said valve controlling a port 121 located in a channel or duct 122 to which is connected a conduit 123 leading to a derichment valve assembly to be described. The primary water inlet chamber 30 communicates with the chamber 118 by means of duct 124, and the secondary inlet chamber 30' communicates with the chamber 117 through passage 34 and ducts 125 and 125'. The valve 119 is of triangular or flat-sided contour to permit flow of water therepast from the chamber 118 to a passage 126 having a restriction 127 therein, said passage communicating with the water tank through a conduit 128 in order to vent the system of air before the water reaches the metering chamber 43.

Beyond the port 121 is a by-pass port or conduit 129 having a restriction or bleed 129', therein, to permit proper functioning of a derichment valve 130 in controlling port 130'; note the fragmentary sectional view of the device metering associated with the water metering unit in Figure 2 of the drawings. This view shows the unmetered fuel chamber 131 in which the metering head is regulated as a function of engine speed, the discharge chamber 132 from which metered fuel flows to the discharge nozzle 20' by way of conduit 21, and the metering orifice construction and arrangement and control needle therefor which has been specially devised for the water-metering system of the present invention. During normal operation (without water injection) the derichment valve 130 is open and fuel is metered or flows through primary metering orifice 133 and thence to discharge chamber 132, and it also flows to the latter chamber through port 130' and secondary metering orifice 134; but when water injection starts and the derichment valve closes, fuel is metered only through orifice 133. The orifices 133 and 134 are controlled by a needle 135 having dual, contoured portions 136 and 137, said needle being connected to a bellows 138 mounted in the housing 18 and which constitutes part of the manifold pressure capsule heretofore noted in connection with the brief reference to the metering device 16. A conduit 138' communicates manifold pressure to the chamber in which bellows 138 is mounted.

The derichment valve 130 is mounted on a diaphragm 140 overlying a chamber 141 to which water is conducted under pressure through conduit 123 when valve 119 is withdrawn from port 121, a spring 142 returning the derichment valve to open position when said port is closed.

That part of the derichment system shown at the lower right-hand part of Figure 2, including the dual contoured needle 135 and coacting components, forms part of my copending application Serial No. 745,003, filed April 30, 1947, which is a continuation-in-part of the present application.

The auxiliary metering system operates substantially as follows:

The chamber 30', passage 34, chamber 41, passages 42, 42', chambers 43, 48 and 50 and passage 51 may be considered a continuous flow conduit or passage terminating in the fuel discharge nozzle 20; the valve 31 creates and maintains a differential pressure thereacross when the water flow is sufficient to justify derichment of the mixture which differential is used across diaphragm 115 to actuate the valve 119 and to control and time the opening or closing of the derichment valve; the valve 38 controls water pressure in chamber 41 and maintains substantially constant the metering head across the metering orifice 46; and the valve 44 constitutes the metering means and operates indirectly as a function of charging pressure and temperature and directly in response to the pressure rise across the supercharger and changes in atmospheric or inlet air temperature.

Assuming the pilot of an airplane equipped with a system such as that herein disclosed desires to go into "emergency power" with accompanying water injection, he moves his power control lever (not shown) to the emergency range and simultaneously depresses the plunger 96' of switch 96 (either manually or automatically), whereupon the circuit is closed to the water pump 26 and solenoid coil 93, the water pump starts operating and the valve 91 opens to admit manifold pressure into chamber 78. If desired, opening of the valve 91 may be delayed until a predetermined amount of pressure has been built up in the system, as by utilizing a separate pressure-actuated switch, interposing a delayed-action switch in the electrical circuit, or by any other means consistent with a particular installation.

As long as the water metering device is idle, or up until the time water pressure is built up in the chamber 41, discharge nozzle pressure in chamber 65 holds the valve 38 off of its seat, so that water coming in through chambers 30, 30' and passage 34 will flow into chamber 41 and pressure will build up in this latter chamber until it equals the pressure in chamber 65 plus the force applied by spring 67; and if at this time the valve 91 is closed, the valve 38 will close, but if the valve 91 is open and the differential across diaphragm 70 has attained a value sufficient to overcome the force of spring 80, metering across valve 44 ensues. The valve 38 will maintain the pressure in chambers 41 and 43 at a constant value above discharge nozzle pressure as determined by the force of spring 67, and this will also result in a constant drop across the metering valve, so that metering of water is in direct relation to the effective area of orifice 46 as determined by the valve 44 which is positioned in accordance with the differential across the diaphragm 70.

If the temperature-compensating unit carried by the cover 71 is used, the rate of metering for a given pressure or metering head in chamber 43 will be controlled by charge pressure and temperature as determined by (1) the rise across the supercharger, and (2) charge temperature as influenced by atmospheric or intake air. Springs 80 and 81 determine the point on the manifold pressure curve at which metering will start, and thereafter as the differential across the diaphragm 70 increases, flow of water will proportionally increase. Ordinarily, the screw 85 provides an adequate range of adjustment. At some predetermined high temperature of the air at the supercharger intake, the needle 105 may be set to close or reach a position of maximum restriction of orifice 111, and assuming maximum supercharger or charging pressure at this temperature, flow of water would attain a maximum. As the temperature varies, the needle 105 variably restricts orifice 111 which in turn varies the differential across diaphragm 70 for a given rise across the supercharger. In this manner water may be metered as a function of both charge pressure and charge temperature.

The derichment system should be timed to close the derichment valve simultaneously with or slightly later than spraying of water with the fuel from the nozzle 20'; in other words, time should be allowed for water to reach the engine cylinders before derichment, and this is particularly important when extremely high temperatures are present. When the metering valve 44 opens and metering ensues, restriction to flow caused by valve 31 produces a differential across this latter valve which is also applied across diaphragm 115, and when this differential attains such magnitude as will overcome the force of the spring 116, valve 119 is retracted from port 121 and water flows by way of conduit 123 to chamber 141 and closes derichment valve 130; whereupon fuel will be metered across orifice 133 only and less fuel for a given weight of air will be metered to the discharge nozzle. When the water metering valve 44 closes, the pressures on opposite sides of valve 31 equalize through orifice 33, and when the differential drops to a predetermined value, the valve 119 seats, and the spring 142 forces the derichment valve open, water pressure in the conduit 123 being relieved back through bleed 129', passage 129 and to the water tank through conduit 128.

The metering device may be used with or without the temperature-compensating unit simply by substituting a plain cover 71 with the restriction 101 and passage 112 communicating chambers 78 and 76.

The temperature-compensating unit may also be arranged to modify the action of the valve 38 and regulate the orifice area of said valve in relation to changes in temperature and thereby vary the metering head across the valve 44 as a function of temperature. This may be done, for example, by locating the bellows 108 in the chamber 65 over the spring 67, so that the force of the latter will vary in relation to changes in temperature of the air in the intake to the supercharger.

While the water or other auxiliary fluid is metered into the primary fuel prior to discharge from the fuel nozzle, it will be obvious that it could be used with a separate nozzle and function to meter water at any predetermined ratio relative to the primary fuel charge. Thus, the auxiliary metering unit may be used independently of the primary fuel-feeding system or it may be interconnected therewith, as desired.

The foregoing and other modifications and rearrangements of parts in the auxiliary metering system herein disclosed will be apparent to those skilled in the art, and it should therefore be understood that the invention is not limited to the particular structure used for the purpose of illustration but only by the appended claims.

I claim:

1. In combination with an engine having an air-induction passage provided with a supercharger and means for supplying fuel to the engine including a fuel discharge nozzle adapted to open when subjected to a predetermined discharge pressure, an auxiliary charge injection system for supplying an auxiliary charging fluid to the primary fuel prior to discharge from said nozzle including a flow passage having a metering valve therein, a pressure-regulating valve in said passage for establishing a desired head across said metering valve, means varying in relation to nozzle pressure urging said regulating valve towards open position against the inlet pressure of unmetered fluid and whereby the metering head on said metering valve is maintained at a predetermined value with respect to nozzle discharge pressure, pressure-responsive means connected to said metering valve, and means for subjecting said pressure-responsive means to the differential between supercharger inlet and supercharger discharge pressure.

2. For use with an engine having an air-induction passage terminating in an intake manifold and provided with a supercharging system and a device for supplying a primary fuel to the engine, an auxiliary charge-injection system for supplying an auxiliary charging fluid to the engine at predetermined manifold pressures including a flow passage having a metering valve therein, pressure-responsive means connected to said valve, means for subjecting said pressure-responsive means to pressures variable in relation to variations in the pressure rise across the supercharging system, and means for modifying the action of said pressure-responsive means as a function of the temperature of the air flowing to the engine.

3. For use with an engine having an air-induction passage terminating in an intake manifold and provided with a supercharging system and a device for supplying a primary fuel to the engine, an auxiliary charge-injection system for supplying an auxiliary charging fluid to the engine at predetermined manifold pressures including a flow passage having a metering valve therein, pressure-responsive means operatively connected to said valve, means for subjecting said pressure-responsive means to the differential between supercharger inlet pressure and supercharger discharge or manifold pressure, and means responsive to variations in the temperature of the air entering said induction passage for modifying the action of said valve.

4. In combination with an engine having an air-induction passage terminating in an intake manifold and provided with a supercharging system and a device for supplying a primary fuel to the engine, an auxiliary charge-injection system for supplying an auxiliary charging fluid to the engine at predetermined manifold pressures including a flow passage having a metering valve therein, pressure-responsive means operatively connected to said valve, means for subjecting said pressure-responsive means to the differential between supercharger inlet pressure and supercharger discharge or manifold pressure, and means responsive to variations in temperature of the air flowing to the engine for modifying said differential, said latter means including a temperature-sensing element exposed to the air on the intake side of the supercharging system.

5. In combination with an engine having an air-induction passage terminating in an intake manifold and provided with a supercharger system and a device for supplying a primary fuel to the engine, an auxiliary charge-injection system for supplying an auxiliary charging fluid to the engine at predetermined manifold pressures including a flow passage having a metering valve therein, a diaphragm or like pressure-responsive element connected to said valve, a passageway communicating supercharger discharge pressure to one side of said diaphragm and another passageway communicating supercharger suction or inlet pressure to the opposite side of the diaphragm to thereby apply a differential across the diaphragm variable in relation to the rise across the supercharging system, a valve effective to modify said differential, and means responsive to changes in the temperature of the air flowing to the engine for regulating said latter valve.

6. In combination with an engine having an air-induction passage terminating in an intake manifold and provided with a supercharger system and a device for supplying a primary fuel to the engine, an auxiliary charge-injection system for supplying an auxiliary charging fluid to the engine at predetermined manifold pressures including a flow passage having a metering valve therein, a diaphragm or like pressure-responsive element connected to said valve, a passageway communicating supercharger discharge pressure to one side of said diaphragm and another passageway communicating supercharger suction or inlet pressure to the opposite side of the diaphragm to thereby apply a differential across the diaphragm variable in relation to the rise across the supercharging system, a valve effective to modify said differential, and means responsive to changes in the temperature of the air flowing to the engine for regulating said latter valve, said latter means including a sensing element located on the intake side of the supercharging system.

7. For use with an engine having an air induction passage provided with an intake manifold and means for supplying a primary fuel to the engine, an auxiliary charge injection system for supplying an auxiliary charging fluid such as an antidetonant to the primary fuel including a flow passage having a metering orifice therein, a metering valve arranged to vary the effective area of said orifice, a pressure responsive device connected to said metering valve, a pressure regulating valve in said passage coacting with said metering valve to control the flow of fluid through said metering orifice, means for controlling said pressure regulating valve to maintain a substantially constant pressure differential across the metering orifice, and means for subjecting said pressure responsive device to a controlling pressure varying substantially with changes in manifold pressures to thereby meter the auxiliary charging fluid as a function of manifold pressure.

8. The combination as claimed in claim 7 wherein means are also provided for modifying said controlling pressure in relation to changes in manifold temperature.

9. For use with an engine having an air induction passage provided with a supercharger and an intake manifold and means for supplying a primary fuel to the engine including a fuel discharge nozzle adapted to open when subjected to a predetermined fuel pressure, an auxiliary charge injection system for supplying an auxiliary charging fluid such as an antidetonant to the primary fuel including a flow passage having a metering orifice therein, a metering valve arranged to vary the effective area of said orifice, a pressure responsive device connected to said metering valve, a pressure regulating valve in said passage coacting with said metering valve to control the flow of fluid to said metering valve, means for controlling said pressure regulating valve to maintain a substantially constant pressure differential across the metering orifice relative to nozzle discharge pressure, and means for subjecting said pressure responsive device to the pressure rise across the supercharger.

10. The combination as claimed in claim 9 wherein means are also provided for modifying the action of said metering valve in relation to the temperature rise across the supercharger.

FRANK C. MOCK.

REFERENCES CITED

The following references are of record in the file of this patent:

UNITED STATES PATENTS

| Number | Name | Date |
|---|---|---|
| Re. 22,254 | Chandler | Jan. 26, 1943 |
| Re. 22,447 | Hersey et al. | Feb. 29, 1944 |
| 2,002,483 | Kimball | May 21, 1935 |
| 2,343,451 | Garretson | Mar. 7, 1944 |
| 2,397,984 | Schorn | Apr. 9, 1946 |

FOREIGN PATENTS

| Number | Country | Date |
|---|---|---|
| 466,041 | Great Britain | May 21, 1937 |
| 523,895 | Great Britain | July 25, 1940 |
| 828,458 | France | May 18, 1938 |

Certificate of Correction

Patent No. 2,509,648                                                       May 30, 1950

FRANK C. MOCK

It is hereby certified that errors appear in the printed specification of the above numbered patent requiring correction as follows:

Column 7, line 41, for the words "device metering" read *metering device*; column 12, line 6, for "pressures" read *pressure*;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*